3,062,630
ANTISTATIC ADDITIVES
James T. Di Piazza, Mountainside, N.J., assignor to Esso Research and Engineering Company, a corporation of Delaware
No Drawing. Filed Mar. 23, 1960, Ser. No. 16,966
16 Claims. (Cl. 44—56)

The present invention relates to the use of additives to improve the properties of organic liquids. In particular, this invention relates to the incorporation of small amounts of additives in aviation turbo-jet fuels, gasolines, kerosines, diesel fuels, organic solvents and other organic liquids boiling in the range between about 75° F. and about 750° F. to improve the electrical properties of these liquids.

Numerous explosions have occurred in recent years during the transportation and handling of gasolines, turbo-jet fuels, dry cleaning solvents and similar combustible organic liquids boiling in the range between about 75° F. and about 750° F. There is mounting evidence that these explosions have, in many cases, been caused by the generation and accumulation of electrical charges within the liquid until vapors of the liquids in admixture with air are ignited by an electrical discharge. Aviation turbo-jet fuels and certain solvents, carbon disulfide for example, are particularly hazardous in this respect because their vapors form explosive mixtures with air over relatively wide temperature ranges, and hence any electrical discharge which occurs is likely to cause an explosion.

Although the exact mechanisms involved in the generation, accumulation and discharge of electrical energy during the handling of combustible liquids are not fully understood, it is known that the electrical conductivity of the liquid plays an important role. Increasing the conductivity of the liquid increases the rate at which charges are naturally dissipated, and therefore charges sufficient to cause an explosion are less likely to accumulate. In general, it has been found that liquids having specific electrical conductivities in the range of about $1 \times 10^{-15}$ and about $1 \times 10^{-12}$ mhos per centimeter are particularly hazardous, and that the danger in handling such liquids can be materially reduced by increasing their conductivities to values greater than about $1 \times 10^{-12}$ mhos per centimeter.

It has been suggested heretofore that certain compounds be added to liquid hydrocarbons and similar combustible materials in order to increase specific conductivity and thus reduce the danger of an explosion due to the generation, accumulation and discharge of electrical energy. Certain metallic compounds, particularly soaps of polyvalent metals and combinations of such soaps with other materials, have been said to be particularly effective. In practice, however, such additives have been found to be of little value because they are readily extracted by water with which the liquids come into contact, and because they adversely affect such properties of the liquids as water tolerance and thermal stability.

The present invention provides a new and improved class of additive agents for use in organic liquids boiling in the range between about 75° F. and 750° F. These additive agents alone and in combination with other compounds greatly improve the electrical properties of such liquids, and do not show the undesirable properties which have characterized additives proposed for this purpose in the past and one especially suitable for fuel use since they are essentially ashless. It has now been found that guanidine alkenoates and especially the guanidine salts of unsaturated fatty acids have the property of greatly increasing the electrical conductivity of petroleum distillates and other organic liquids. Further, it has been discovered that these salts and/or guanidine by itself in combination with quaternary ammonium salts have enhanced effectiveness in promoting electrical conductivity. Furthermore, it has been discovered that the method of addition and certain combinations thereof produces synergistic effects not to be expected by the sum of their individual behavior. It has also been found that the utilization of the guanidine salts of unsaturated fatty acids in an alcoholic solvent have increased ability to promote electrical conductivity. Besides increasing the electrical conductivity of the liquids in which they are employed the above additives and combinations and the synergistic mixtures thereof are not extracted by water from such liquids to an extent sufficient to prevent their utilization, and do not adversely affect other properties of the liquid in which they are incorporated.

Guanidine, the basic material of the novel additive agent, is an isolog of urea and is a well known material readily available from commercial sources.

The guanidine salts of unsaturated fatty acids which are employed in accordance with the invention are easily prepared by methods known to those skilled in the art, one method of preparation being the direct reaction of guanidine with the unsaturated fatty acid. This is accomplished by the addition of $[(NH_2)_2CNH]_2 \cdot H_2CO_3$ to the unsaturated fatty acid. A rapid liberation of carbon dioxide occurs at about 180° F. while the reaction continues to about 350° F. The resulting product is a clear, viscous liquid.

The guanidine salts of the instant invention may be represented by the formula:

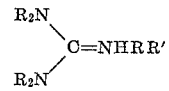

wherein R' represents the organic radical of a substituted or unsubstituted, unsaturated aliphatic carboxylic acid having from 8 to about 30 carbon atoms per molecule, and wherein R represents a radical selected from the group consisting of hydrogen and an alkyl radical having from 1 to 24 carbon atoms per molecule, and wherein R does not necessarily represent the same organic radical. The preferred guanidine salts are those compounds wherein R' is an unsubstituted, unsaturated aliphatic carboxylic acid having from 10 to 24 carbon atoms, and R is a radical selected from the class consisting of hydrogen and an alkyl radical of from 1 to 12 carbon atoms per molecule. Especially preferred are those compounds wherein R' is an unsubstituted, unsaturated monocarboxylic fatty acid radical having from 12 to 18 carbon atoms per molecule and R is hydrogen.

Suitable aliphatic carboxylic acids include linoleic acid, oleic acid, ricinoleic acid, erucic acid, linolenic acid, and the like. The acids utilized in the preparation of the guanidine salts of the present invention may be those commercial mixtures of saturated and unsaturated fatty acids whose average number of carbon atoms fall within the ranges specified above. These acids may be derived from animal, vegetable, and natural oil fats or waxes or any combination thereof. Suitable commercial fatty acid mixtures include: Actinol D, a commercial mixture of fractionated talloil comprising approximately equal parts of linoleic and oleic acid, commercial mixtures of soya type fatty acids comprising approximately 24% oleic acid, 61% linoleic acid, 8% linolenic acid, and 7% of saturated acids, dimer acids, and the like.

Guanidine tallate is the most preferred specific compound of the guanidine salts, being attractive because of its ease of preparation from readily available, low cost commercial fatty acid mixtures, and its lack of water sensitivity. Guanidine itself can be utilized in combination with the quaternary ammonium compounds to give synergistic effects, but due to its limited oil solubility it may have certain practical limitations, and thus is preferred only under certain conditions.

It has been found that the solution of the guanidine salts of the instant invention with or in a polar solvent greatly enhances the effectiveness of the guanidine salts as a conductivity promoting additive. The electrical conductivity increasing power of guanidine salts and in particular guanidine tallate is increased by the selection of a suitable alcoholic solvent. Suitable alcoholic solvents are those aliphatic and aromatic alcohols containing one or more hydroxy radicals per molecule. Preferred are those unsubstituted saturated aliphatic alcohols, while especially preferred are the polyglycols having molecular weights of not more than 800. Suitable alcohols include methyl alcohols, ethyl alcohol, benzyl alcohol, isopropyl alcohol, ethylene glycol, polyethylene glycol, and the like.

It has been discovered that the activity of the guanidine salts of unsaturated fatty acids can be greatly enhanced by the addition of a cationic agent such as tetra aliphatic quaternary ammonium salts. The addition of a mixture of guanidine salts and/or guanidine and the quaternary salt as a finished additive concentrate to the organic liquid base resulted in enhanced electrical conductivities. The applicant has further discovered that the separate addition of the quaternary salt to the base liquid gives exceptionally high electrical conductivity results. The marked increase in conductivity is higher than the expected sum of the conductivities of either component utilized separately, and higher than the sum of the conductivities when the components are utilized in a combination premixed additive.

The exact mechanism for the synergism is unknown to the applicant. It has been hypothesized, though it should not be taken to restrict the present invention, that the unexpected increase in electrical conductivity is probably due to a colloidal phenomenon. It is believed that one component is much more effective when the other component is widely dispersed in a dilute solution.

The quaternary ammonium salts which are suitable for use in accordance with the present invention are those quaternary ammonium compounds having substituent groups of from 1 to about 24 carbon atoms. The substituent groups may be alkyl, alkenyl, aromatic, or cycloaliphatic groups. The preferred quaternary ammonium compounds are those quaternary ammonium salts having unsubstituted aliphatic groups of from 1 to about 24 carbon atoms. Examples of suitable quaternary ammonium salts include ammonium hydroxide and ammonium chloride having the following substituent groups attached directly to the quaternary nitrogen atom: tetramethyl, tetrapropyl, methyltributyl, dimethyldibutenyl, isopropyltrihexyl, diethyldihexadecyl, dimethyldioleyl, trimethyloleyl, butyltrioleyl, dibutyldicyclopentyl, tetraheptadecyl, tetraeicosyl, dimethylbenzyl soya, triethyltotyl, trimethylcyclohexyl, dimethyldilauryl, dimethyldicocoa, trimethyl soya, and the like.

The quaternary ammonium salts useful in the present invention also include mixed quaternary ammonium compounds derived from naturally occurring materials such as coconut oil, tallow fat and soybean oil. One such material, for example, is trimethyl soya ammonium chloride, which is derived in part from soybean oil, and consists of a mixture of trimethyl mono-long-chain-alkyl ammonium chlorides wherein the long chain alkyl groups consist of about 8% $C_{16}$ radicals, about 91% $C_{18}$ radicals and about 1% $C_{20}$ radicals. Another suitable material, for example, is dimethyldicocoa ammonium chloride, which is derived in part from cocoanut oil and consists of a mixture of about 8% $C_8$ radicals, 7% $C_{10}$ racicals, 50% $C_{12}$ radicals, 17% $C_{14}$ radicals, 11% $C_{16}$ radicals, and 7% $C_{18}$ radicals. Similar mixed compounds may be derived from other naturally occurring materials and will be familiar to those skilled in the art. Quaternary ammonium salts having one or more such mixed groups are generally less expensive than the single compounds and will, in many cases, be preferred for use in accordance with the invention.

Suitable and preferred commercial mixtures of quaternary ammonium compounds are those ammonium salts of the alkyl trimethyl ammonium chloride and dialkyl dimethyl ammonium chloride types, wherein the alkyl chains have from 8 to 20 carbon atoms. Suitable commercial mixtures are Arquad S comprising about 50% of trimethyl soya ammonium chloride in isopropanol and Aliquat 221 comprising about 75% of dimethyldicocoa ammonium chloride in isopropanol.

The guanidine components of the invention are incorporated in organic liquids in minor amounts sufficien to prevent or reduce the accumulation or generation of static charges in the organic liquid occasioned by the handling, transportation, or storage of the said liquid. The guanidine salts may be employed in concentrations ranging between 0.0001% to about 1.0% by weight, while concentrations between 0.001% and about 0.05% by weight are generally preferred.

The synergistic effects of the guanidine component and the quaternary ammonium compounds of the invention can be obtained by employing a ratio of guanidine and/or guanidine salt to quaternary compound of between 0.1 and 50, with a preferred ratio of between 0.5 and 25. The unexpected effect of the polar solvent may be obtained by utilizing concentrations of the solvent of between 0.0001% and about 1.0% by weight, while concentrations between 0.001% and about 0.05% by weight are generally preferred.

The use of combinations of guanidine salts with quaternary ammonium salts such as guanidine tallate and a dimethyldicocoa ammonium chloride in alcohol permit very low concentrations of these additives to be most effective. It will be recognized, however, that the concentrations to be employed will depend somewhat upon the particular guanidine salt utilized, the particular quaternary ammonium salt utilized in combination with the guanidine component, the type of alcohol solvent which is employed, the method of addition of the guanidine component and quaternary ammonium salt, and other factors as disclosed in this application.

The combustible organic liquids in which the additives of the invention may be employed advantageously are those boiling in the range between about 75° F. and about 750° F. and include carbon disulfide, hexane, heptane, bromobenzene, turpentine, diethyl ether, toluene, petroleum naphtha, xylene, gasoline, aviation turbo-jet fuel, kerosine and the like. The additives are particularly useful in gasoline, aviation turbo-jet fuel, kerosine, diesel fuel and similar petroleum distillate fuels. Gasolines which may be benefitted by the presence of the additive include both motor gasolines and aviation gasolines such as those defined by ASTM Specifications D–910–56 and D–439–56T. Aviation turbo-jet fuels in which the additives of the invention are particularly useful are described at length in U.S. Military Specifications MIL–F–5616, MIL–F–5624D, MIL–F–25,558A and MIL–F–25,524A. Diesel fuels as referred to in connection with the invention are defined in ASTM Specification D–975–53T.

If desired, the guanidine salts may be incorporated in the organic liquids alone in the concentrated form, or with a polar solvent, or in a premixed combination with the quaternary ammonium salts, or separately previous to the addition of the quaternary ammonium salt. The additives of the instant invention may be used in combination with other additives normally added to combustible organic liquids. Such conventional additives normally employed in petroleum distillate fuels include rust inhibitors, dyes, dye stabilizer, antioxidants, detergents, and the like.

The exact nature and objects of this invention may be more fully understood from the following examples.

EXAMPLE 1

A guanidine tallate was prepared by the reaction of 1 mole of $[(NH_2)_2CNH]_2 \cdot H_2CO_3$ with a commercial mixture of 1 mole of talloil fatty acids. The talloil mixture comprised about 50% by weight oleic acid and about 50% by weight of linoleic acid. At about 180° F. a rapid liberation of carbon dioxide took place, while the reaction continued to about 350° F. and resulted in an oil soluble clear, viscous liquid. Similarly, the guanidine oleates, guanidine linoleate and the other guanidine salts of the invention were prepared.

EXAMPLE 2

In order to demonstrate the effectiveness of the guanidine salts of unsaturated fatty acids such as prepared in Example 1, tests were carried out to determine the specific conductivity of samples of aviation turbo-jet fuel, and samples of the same fuel to which had been added the guanidine salts. The turbo-jet fuel employed in these tests was representative of the fuels classified as JP-4 jet fuels and defined by U.S. Military Specification MIL-F-5624D. It had an API gravity of about 48.7°, a Reid vapor pressure of about 2.5 pounds per square inch and a boiling range of from about 100° to about 520° F.

The tests were carried out by applying a fixed, direct-current voltage across a standard conductivity cell containing the sample to be tested. A standard high-resistance element was connected in series with the cell and the current which flowed in the circuit during the test was computed by measuring the voltage across the resistance element and applying Ohm's law. The resistance of the sample, the specific resistance, and the specific conductivity were in turn computed. The results of these tests are shown below for the base fuel and for the samples of the base fuel containing the various salts.

Table I
EFFECT OF GUANIDINE SALT ADDITIVES UPON ELECTRICAL CONDUCTIVITY

| Composition | Specific Conductivity, $\sigma$, mho/cm.$\times 10^{-12}$ | Ratio, $\sigma$(Base +Additive) to $\sigma$ Base |
| --- | --- | --- |
| Base JP-4 | 0.05 | |
| Base JP-4+0.01% guanidine tallate | 1.6 | 32 |
| Base JP-4+0.01% guanidine oleate | 1.2 | 24 |
| Base JP-4+0.01% guanidine linoleate | 3.2 | 64 |

The data in Table I above demonstrate that the addition of small amounts of guanidine salts of unsaturated fatty acids produced a marked increase in the specific conductivity of a combustible organic liquid. The guanidine linoleate was especially effective in increasing the specific conductivity. By virtue of their increased conductivity, combustible organic liquids containing these additives are much less likely to accumulate electrical charges than are similar liquids not containing the additives. The danger of an explosion while handling such liquids is thus reduced as a result of the presence of the additives.

EXAMPLE 3

Small amounts of water frequently accumulate in aviation turbo-jet fuels, kerosines, and similar combustible liquids during storage. The effect of additives employed in such liquids upon their water tolerance properties is, therefore, of primary importance. It has been found that many of the additives suggested as useful for increasing the conductivity of combustible organic liquids in the past are highly surface-active materials which have an extremely adverse effect upon water tolerance. The increased conductivity brought about through the use of such additives may largely be offset as a result of this tendency to promote the suspension of dispersed water.

In order to determine the effect of the guanidine salts on the water tolerance of combustible organic liquids to which they are added, water tolerance tests were carried out in accordance with the method described in Federal Test Standard No. 791, Method 3251.6, "Interaction of Water and Aircraft Fuel." In brief, this test comprises agitating 80 cc. of the fuel to be tested with 20 cc. of water for a 2-minute period and then allowing the water to settle for 5 minutes. At the end of the settling period, the condition of the water-fuel interface is noted. The interface rating is assigned as follows:

INTERACTION OF WATER AND AIRCRAFT FUELS
[Method 3251.6, Fed. Test Std. No. 791]

| Appearance of interface: | Interface rating |
| --- | --- |
| Clear and clean | 1 |
| A few small clear bubbles covering not more than 50% of the interface | 1B |
| Shred of lace and/or film at interface | 2 |
| Loose lace and/or slight scum | 3 |
| Tight lace and/or heavy scum | 4 |

The condition of the fuel layer and the water layer on either side of the interface is also noted. An interface rating of 1 or 1B, with no sign of haze or emulsion in the fuel or water layer, is a passing rating and meets the requirements of the military specifications governing the water tolerance of aviation turbo-jet fuels. The results obtained in tests of the additives of the invention and additives representative of the prior art are shown in Table II.

Table II
WATER TOLERANCE OF GUANIDINE ADDITIVES

| Composition: | Water tolerance interface rating |
| --- | --- |
| Base JP-4 | 1 |
| Base JP-4+0.01% guanidine tallate | 1 |
| Base JP-4+0.01% guanidine oleate | 1 |
| Base JP-4+0.01% guanidine linoleate | 1 |
| Base JP-4+0.01 wt. percent of calcium petroleum sulfonate | 4 |
| Base JP-4+0.05 wt. percent of sodium dioctyl sulphosuccinate | 4 |
| Base JP-4+0.01 wt. percent of lecithin | 4 |

It will be noted that the addition of the guanidine salts of the invention to the turbo-jet fuel does not reduce the interface rating below the acceptable level of 1B. The additives thus meet the critical water tolerance requirements for turbo-jet aviation fuels. The prior art materials, on the other hand, gave ratings which clearly disqualify them for such use.

EXAMPLE 4

The guanidine salt of talloil is a clear viscous liquid which should be dissolved in a suitable solvent before use. The data below indicate that the electrical conductivity increasing ability of the guanidine salts of unsaturated fatty acids is greatly enhanced by the selection of a suitable alcoholic solvent.

Table III
EFFECTIVENESS OF ALCOHOLIC SOLVENTS WITH GUANIDINE SALTS

| Composition: | Specific conductivity, mho/cm. |
| --- | --- |
| Base JP-4 with 0.01% by weight guanidine tallate added in a 50% solution (0.01% by weight) of: | |
| Toluene | $8.1 \times 10^{-12}$ |
| Isopropyl alcohol | $14.0 \times 10^{-12}$ |
| Methyl alcohol | $16.0 \times 10^{-12}$ |
| Polyethylene glycol 200 | $22.0 \times 10^{-12}$ |

The above data in Table III clearly demonstrate that a 50% solution of guanidine tallate in a polyethylene glycol having a molecular weight of about 200 was nearly threefold as effective as the corresponding solution in toluene for improving the electrical conductivity of JP-4. Thus, the addition of small amounts of polar solvents, especially alcohols, in the total composition unexpectedly enhances the effectiveness of guanidine salts in promoting electrical conductivity.

EXAMPLE 5

It has been discovered that the use of combinations of the guanidine and guanidine salts with quaternary ammonium salts are more effective conductivity-increasing additives than either component used individually. The quaternary ammonium salts utilized in the following data of Table IV were those commercial mixtures designated Aliquat 221 and Arquad S.

Table IV
SYNERGISTIC EFFECT OF MIXTURE OF GUANIDINE TALLATE (GT) AND QUATERNARY AMMONIUM SALTS ON CONDUCTIVITY

| Percent Composition as 0.01% Additive in JP-4 Base | | | σSpecific Conductivity ×10⁻¹² | Ratio, σBase+ Additive/ σBase |
|---|---|---|---|---|
| Guanidine Tallate | Aliquat 221 | Arquad S | | |
| 0 | 0 | 0 | 0.04 | |
| 100 | | | 2.1 | 53 |
| | 100 | | 5.4 | 135 |
| | | 100 | 2.6 | 65 |
| 70 | | 30 | 20.0 | 500 |
| 60 | | 40 | 24.0 | 600 |
| 70 | 30 | | 23.0 | 576 |
| 60 | 40 | | 19.0 | 476 |
| 70 | 15 | 15 | 17.0 | 427 |
| 60 | 20 | 20 | 21.0 | 528 |
| 50 | ¹25 | ¹25 | 20.0 | 500 |

¹ Equal mixtures by volume of aliquat 221 and Arquad S.

The above data demonstrate the synergistic effectiveness of the premixed guanidine-quaternary ammonium additive mixture in increasing the specific conductivity of the JP-4 base fuel. Mixtures of guanidine tallate and dimethyl dicocoa ammonium chloride and/or trimethyl soya ammonium chloride in 70/30 to 50/50 proportions are shown by the above data to be particularly effective in increasing the electrical conductivity of the base liquid.

EXAMPLE 6

The marked increases in electrical conductivity when the guanidine-quaternary ammonium salt synergistic combination is utilized in a combustible organic liquid is effective at very low concentrations of the additive.

Table V
EFFECT OF CONCENTRATION ON CONDUCTIVITY

| Composition | Specific Conductivity, σ5 mho/cm. | Rate of σ(Base +Additive) to σ Base |
|---|---|---|
| Base JP-4 | 4.0×10⁻¹⁴ | |
| Base JP-4+0.0025% mixture ¹ | 6.2×10⁻¹² | 156 |
| Base JP-4+0.005% mixture ¹ | 11×10⁻¹² | 275 |
| Base JP-4+0.01% mixture ¹ | 20×10⁻¹² | 500 |

¹ Mixture is equimolar quantities of guanidine and Aliquat 221.

The above data demonstrate the effectiveness of the addition of dimethyl dicocoa ammonium chloride with guanidine in increasing the electrical conductivity of the base fuel JP-4. The above data indicate that concentrations as low as 0.0025% of the above mixture are effective.

EXAMPLE 7

It has been discovered that the conductivity-increasing effect of the guanidine salts of unsaturated fatty acids in JP-4 base fuel is increased by the separate addition of a quaternary ammonium salt. Exceptionally higher electrical conductivities are obtained when the quaternary ammonium salts are added to a dilute blend of guanidine salts in combustible organic liquids. The unexpected increase in electrical conductivity by the subsequent addition of the quaternary ammonium salts is shown by the data in Table VI below.

Table VI
INCREASED SPECIFIC CONDUCTANCE BY BLENDING SEPARATELY A GUANIDINE SALT AND A QUATERNARY AMMONIUM SALT

| Composition | Specific Conductance, σmho/cm. ×10⁻¹² | Rate of σ(Base +Additive) to σBase |
|---|---|---|
| Base fuel JP-4 | 0.04 | |
| Base JP-4+0.01% guanidine tallate (1) | 2.1 | 53 |
| (1)+0.0025% Arquad S | 17 | 425 |
| (1)+0.005% Arquad S | 32 | 800 |
| (1)+0.01% Arquad S | 68 | 1,700 |
| (1)+0.02% Arquad S | 68 | 1,700 |
| (1)+0.0025% Aliquat 221 | 77 | 1,930 |
| (1)+0.005% Aliquat 221 | 80 | 2,000 |
| (1)+0.01% Aliquat 221 | 80 | 2,000 |

The above data when taken in conjunction with Example 5 where the additive concentrate was premixed, demonstrate the unexpected synergistic effectiveness of the guanidine salt-quaternary ammonium salt combination when blended separately. Separate blending of the quaternary ammonium salt to a base liquid already containing the guanidine salt increased the specific conductivity over three-fold the value attained by adding the components as a premix additive.

In summary, the guanidine salts of unsaturated fatty acids are effective conductivity-increasing additives and possess good water separation characteristics. The use of quaternary ammonium salts with the guanidine salts is effective to unexpectedly and markedly increase the electrical conductivity of the base liquid with separate blending of the components even more effective.

What is claimed is:

1. A combustible organic liquid boiling in the range between about 75° F. and about 750° F. containing a minor amount of a compound sufficient to enhance the electrical conductivity of the said liquid, said compound having the formula:

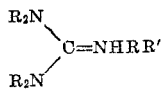

wherein R' represents the organic radical of an unsaturated aliphatic carboxylic acid having from 8 to about 30 carbon atoms per molecule, and wherein R represents a radical selected from the group consisting of hydrogen and an alkyl radical having from 1 to about 24 carbon atoms.

2. The organic liquid as defined by claim 1, wherein said R is hydrogen and R' has from 10 to about 24 carbon atoms per molecule.

3. The organic liquid as defined by claim 1, wherein said composition contains additionally a minor amount of an unsubstituted tetra aliphatic sufficient to enhance the electrical conductivity of said liquid quaternary ammonium salt wherein each aliphatic group contains from 1 to about 24 carbon atoms, the ratio of said compound to said ammonium salt being between 0.1 and about 50.

4. A combustible organic liquid boiling in the range between about 75° F. and about 750° F. containing from about 0.0001% to about 1.0% by weight of a guanidine component selected from the class consisting of guanidine and a guanidine salt of an unsaturated fatty acid having from 8 to about 30 carbon atoms per molecule; and an unsubstituted tetra aliphatic quaternary ammonium salt. wherein each aliphatic group contains from 1 to about 24 carbon atoms, the ratio of said guanidine component to said ammonium salt being between 0.1 and about 50.

5. The organic liquid as defined by claim 4, wherein said composition contains additionally from about 0.0001 to about 1.0% by weight of a saturated aliphatic alcohol.

6. A petroleum distillate fuel boiling in the range between about 75° F. and about 750° F. containing from about 0.0001% to about 1.0% by weight of a guanidine component selected from the class consisting of guanidine and a guanidine salt of an unsaturated fatty acid having from about 10 to 24 carbon atoms per molecule; and a tetra alkyl quaternary ammonium salt wherein the said alkyl groups each contain from 1 to 24 carbon atoms, the ratio of said guanidine component to said ammonium salt being between 0.5 and about 25.

7. The organic liquid as defined by claim 4, wherein said composition contains additionally from about 0.0001% to about 1.0% by weight of a polyglycol having a molecular weight of not more than 800.

8. The organic liquid as defined by claim 4, wherein said guanidine salt is guanidine tallate and said ammonium salt is trimethyl soya ammonium chloride.

9. The organic liquid as defined by claim 4, wherein said guanidine salt is guanidine tallate and said ammonium salt is dimethyldicocoa ammonium chloride.

10. A method of incorporating an antistatic additive into a combustible organic liquid boiling in the range between about 75° F. and about 750° F., which method comprises the separate incorporating into the said liquid of about 0.0001% to about 1.0% by weight of a guanidine component selected from the group consisting of guanidine and a guanidine salt of an unsaturated fatty acid having from 8 to 30 carbon atoms per molecule; and an unsubstituted tetra aliphatic quaternary ammonium salt wherein the aliphatic groups each contain from 1 to 24 carbon atoms, the ratio of the guanidine component to the ammonium salt being between 0.1 and about 50.

11. A method of incorporating an antistatic additive into a petroleum distillate fuel boiling in the range between about 75° F. and about 750° F., which method comprises the separate incorporating into the said fuel of about 0.0001% to about 1.0% by weight of a guanidine component selected from the group consisting of guanidine and a guanidine salt of an unsaturated fatty acid having from 10 to 24 carbon atoms per molecule; and a tetra alkyl quaternary ammonium salt wherein the alkyl groups each contain from 1 to 24 carbon atoms, the ratio of said guanidine component to the ammonium salt being between 0.5 and about 25.

12. A method as defined by claim 11, wherein the said guanidine salt is guanidine tallate; and the quaternary ammonium salt is trimethyl soya ammonium chloride.

13. A method as defined by claim 11, wherein the said guanidine salt is guanidine tallate; and the quaternary ammonium salt is dimethyldicocoa ammonium chloride.

14. A method as defined by claim 11, wherein the said quaternary ammonium salt is incorporated into the said fuel subsequent to the addition of the said guanidine component.

15. The organic liquid as defined by claim 1 wherein said minor amount is from 0.0001% to about 1.0% by weight.

16. The organic liquid as defined by claim 4 wherein said guanidine salt is guanidine tallate.

References Cited in the file of this patent

UNITED STATES PATENTS

| | | |
|---|---|---|
| 1,939,659 | Calcott et al. | Dec. 19, 1933 |
| 2,626,876 | Carnes | Jan. 27, 1953 |
| 2,730,464 | Winsor | Jan. 10, 1956 |
| 2,746,928 | Darragh et al. | May 22, 1956 |
| 2,917,378 | Vitalis et al. | Dec. 15, 1959 |

FOREIGN PATENTS

| | | |
|---|---|---|
| 749,898 | Great Britain | June 6, 1956 |

OTHER REFERENCES

"Arquads," by Armour and Co., February 1950, pages 1 and 2.